US009842277B2

(12) United States Patent
Demarais et al.

(10) Patent No.: US 9,842,277 B2
(45) Date of Patent: Dec. 12, 2017

(54) SYSTEM AND METHOD FOR ESTIMATING AGE OF A LIVE ANIMAL

(71) Applicants: Stephen Demarais, Starkville, MS (US); Bronson K. Strickland, Starkville, MS (US); Jeremy Flinn, Columbia, MO (US)

(72) Inventors: Stephen Demarais, Starkville, MS (US); Bronson K. Strickland, Starkville, MS (US); Jeremy Flinn, Columbia, MO (US)

(73) Assignee: Mississippi State University, Mississippi State, MS (US)

( * ) Notice: Subject to any disclaimer, the term of this patent is extended or adjusted under 35 U.S.C. 154(b) by 0 days.

(21) Appl. No.: 14/870,337

(22) Filed: Sep. 30, 2015

(65) Prior Publication Data

US 2016/0140706 A1 May 19, 2016

Related U.S. Application Data

(60) Provisional application No. 62/071,699, filed on Sep. 30, 2014.

(51) Int. Cl.
| | |
|---|---|
| *G06K 9/00* | (2006.01) |
| *G06K 9/62* | (2006.01) |
| *G06T 7/62* | (2017.01) |
| *G06K 9/52* | (2006.01) |

(52) U.S. Cl.
CPC ....... *G06K 9/6202* (2013.01); *G06K 9/00362* (2013.01); *G06K 9/52* (2013.01); *G06T 7/62* (2017.01); *G06T 2207/20076* (2013.01)

(58) Field of Classification Search
CPC ... G06T 7/00; H04N 7/18; G06K 9/62; G06K 9/00; G06N 7/00
USPC .................................................. 382/110
See application file for complete search history.

(56) References Cited

U.S. PATENT DOCUMENTS

| | | | | |
|---|---|---|---|---|
| 2005/0224001 A1* | 10/2005 | Golden | ......... | A01K 29/00 119/51.02 |
| 2015/0069118 A1* | 3/2015 | Roys | ......... | G09F 3/0297 235/380 |

OTHER PUBLICATIONS

Bob Strauss, 2010, about education, Dinosaurs A to Z, retrieved from Internet from URL http://dinosaurs.about.com/od/typesofdinosaurs/a/dinosaursatoz.htm, retrieved on Dec. 16, 2016. Beginning pp. 1-6.*
Google, 2015, Smallest Animals, retrieved from Internet retrieved on Dec. 16, 2016 from URL: https://www.google.com/search?q=smallest+animals&tbm=isch&tbo=u&source=univ&sa=X&ved=0ahUKEwi_ l17CiPnQAhUJJMAKHbKFBSMQsAQIOQ&biw=1200&bih=1835.*
Google, 2015, Largest Animals, retrieved from Internet retrieved on Dec. 16, 2016 from URL: https://www.google.com/search?q=smallest+animals&tbm=isch&tbo=u&source=univ&sa=X&ved=0ahUKEwi_ l17CiPnQAhUJJMAKHbKFBSMQsAQIOQ&biw=1200&bih=1835#tbm=isch&q=largest+animals.*
Google, 2015, anatomical animal terms, Retrieved from Internet on Dec. 16, 2016, retrieved from URL: https://www.google.com/search?q=anatomical+terms&biw=1200&bih=1835&tbm=isch&tbo=u&source=univ&sa=X&ved=0ahUKEwiTmuySynQAhVFDsAKHVm3BWYQsAQlag#tbm=isch&q=anatomical+animal+terms&imgrc=_.*

(Continued)

*Primary Examiner* — Gregory F Cunningham
(74) *Attorney, Agent, or Firm* — Lawrence Arthur Schemmel

(57) ABSTRACT

The system and method of the invention utilizes computer software to determine an estimation of the age of an animal by measuring, analyzing, comparing, calculating, and pre- (Continued)

senting age features and the age of animals such as deer, moose, elk, bovids, pronghorns and the like from digital data and/or photographs of the animals.

20 Claims, 1 Drawing Sheet

(56) References Cited

OTHER PUBLICATIONS

Ron Kurtus, 'Comparison of Animal Ages', Sep. 13, 2011, School for Champions', Retrieved on Dec. 19, 2016 from URL: http://www.school-for-champions.com/animalhealth/animal_ages.htm#.WFgdpflViZQ.*

Flinn et al., 'Estimating age and antler traits of photographed male white-tailed deer', Retrieved on Dec. 19, 2016 from URL: https://www.researchgate.net/publication/270274065_Estimating_age_and_antler_traits_of_photographed_male_white-tailed_deer.*

\* cited by examiner

A
B
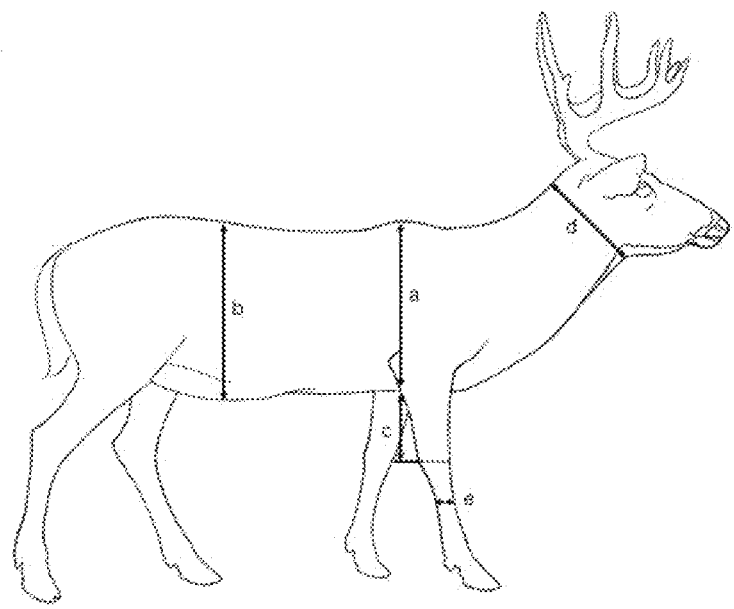
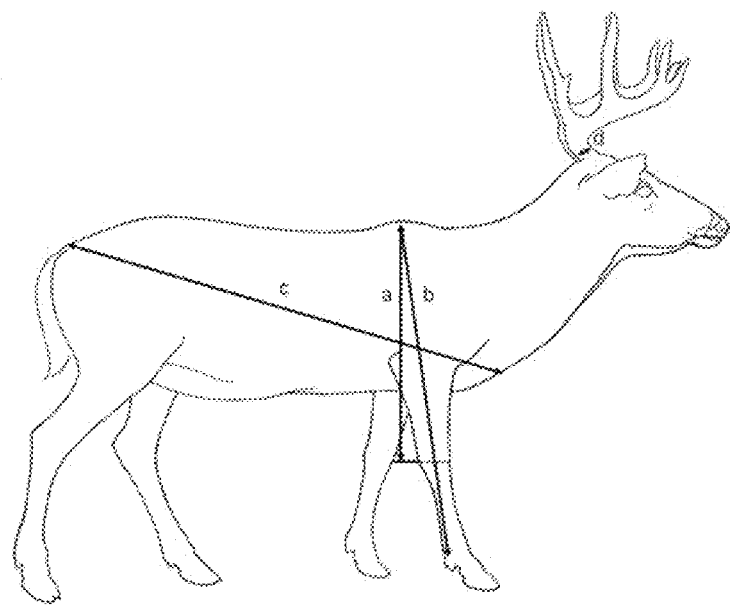

SYSTEM AND METHOD FOR ESTIMATING AGE OF A LIVE ANIMAL

CROSS-REFERENCE TO RELATED APPLICATION

This application claims priority from U.S. Provisional Patent Application Ser. No. 62/071,699 filed Sep. 30, 2014. The entirety of that provisional application is incorporated herein by reference.

STATEMENT OF GOVERNMENT SUPPORT

This invention was made with government support under 14-5029-0-2-303 awarded by the U.S. Department of the Interior. The government has certain rights in the invention.

FIELD OF THE INVENTION

The present invention relates to the field of computer software and specifically to a computer software system and method for analyzing, comparing, calculating, estimating, and displaying the age of animals, particularly deer, moose, elk, and the like.

SUMMARY OF THE INVENTION

The present invention provides a new system and method that uses computer software to analyze, compare, calculate, estimate, and display the ages of animals, such as deer, moose, elk, bovids, and pronghorns, from the analyses of digital data and/or digital photographs of the animals.

Hunting and animal enthusiasts and managers often have a need to estimate and judge the ages of animals and deer. Trail cameras are scouting tools that generate photographs of deer and other animals of unknown age. Estimating animal age from such data and photographs typically can hone an enthusiast's or hunter's field estimating skills and improve decisions and efficiency in selective harvesting. The invention allows for the accurate collection and analysis of data from electronic images and photographs and can be an important part of herd monitoring programs and research projects. The software system and method of the invention allows users to estimate, compare, and display age and age characteristics from digital data and electronic images and/or photographs. The present invention utilizes a unique set of anatomical features and statistically-derived, predictive equations to achieve accurate estimates of animal ages and related characteristics.

With the foregoing and other objects, features, and advantages of the present invention that will become apparent, the nature of the invention may be more clearly understood by the following detailed description of the preferred embodiments of the invention and by the appended claims.

BACKGROUND OF THE INVENTION

The present invention in a preferred embodiment provides a system and method that is distinctive from prior art systems and methods. For example, several non-technical publications propose subjective physical characteristics to distinguish live, male age classes of deer; the most common body features were stomach and chest girth and their relationship to each other (Kroll 1996, Demarais et al. 1999, Richards and Brothers 2003). Age determination using these subjective descriptions of age-related changes in body features requires the user to visually estimate relationships without the ability to take specific measurements of unrestrained animals. The most commonly accepted method used by biologists to age animals such as deer is by examining the jaw bone and by using the tooth replacement and wear technique. That method for aging animals and deer consists of examining replacement and wear characteristics of the teeth (Severinghaus 1949) and requires killing the animal or deer and removal of the jaw for examination by a trained biologist. Research has shown that the tooth replacement and wear method is only 25% accurate above the age of 2 years (Gee, et al. 2002).

One current method of aging live deer, using a subjective evaluation of relative body features (Kroll, 1996; Demarais, et al. 1999; Richards and Brothers, 2003), averaged only about 24% accuracy for animals above 2 years of age (Gee, et al. 2013). The present invention uses quantitative measurements that can be collected by relatively untrained individuals to estimate animal age with accuracy levels superior to the tooth replacement and wear technique of Severinghaus, and this is accomplished without having to kill the animal. Accuracy of the present invention was approximately 54% during the pre-rut period and approximately 62% during the post-rut period.

No other software system or method exists like the invention that estimates ages of animals and specifically deer. The present invention in a preferred embodiment is distinguishable from prior art systems and methods mainly because it uses objective measurements taken of an unrestrained animal from photographs and calculates specific, quantified ratios that are associated with specific age classes of animals. An accurate, live-animal, age estimation technique is needed because age distribution is an essential component of animal and white-tailed deer management strategies based on population dynamics (Govern et al. 2006). The software of the present invention utilizes novel predictive equations to estimate the age of animals, such as deer and the like. The invention is capable of age grouping of animals with a high accuracy rate.

A need and demand exists by animal scientists, wildlife biologists and managers, and animal enthusiasts for an effective and accurate system for estimating animal age and related characteristics. The present invention provides a system and method based upon computer software to estimate and calculate the age of animals using photographs and complex models comprised of predictive equations.

BRIEF DESCRIPTION OF THE DRAWINGS

The drawings that accompany the detailed description of the invention are intended to illustrate further the invention and its advantages. The drawings, which are incorporated into and form a portion of the specification, illustrate certain preferred embodiments of the invention and, together with the entire specification, are meant to explain those preferred embodiments of the present invention to those skilled in the art:

FIG. 1 is a schematic illustration showing proper view and specific morphometric measurements used to calculate ratios for age class separation of live, male white-tailed deer from Mississippi, Louisiana, Texas, and Oklahoma.

DETAILED DESCRIPTION OF THE INVENTION

The present invention provides a new system and method to determine the age of an animal by utilizing photographs and analyses using computer software. The invention provides a software means to calculate and compare animal age with digital data and images from multiple source inputs and sources and to display the compared data and images for further analyses by user(s). The invention uses a computer-based, i.e., a computer processor-based, device to accurately obtain age estimation results.

Introduction

Age and data collection from free-ranging wildlife benefits researchers, managers, and enthusiasts. Remotely-triggered cameras (RTCs) have been used successfully to estimate white-tailed deer density and sex ratio (Jacobson et al. 1997, McKinley et al. 2006, Roberts et al. 2006). Accurate age estimation utilizing the present invention provides additional valuable data. Remotely-triggered camera photographs of animals can provide accurate samples of age estimations using the invention for researchers and educational opportunities for hunters and animal enthusiasts.

Methods

The inventors obtained and utilized up to nine (9) quantitative measures of body features to calculate morphometric ratios from 144 photographed, captive, known-age male white-tailed deer from Mississippi to develop age-predicting models. Photographs were taken from September to October, 2007-2009, and from late January to February, 2007-2009, to represent the pre- and post-breeding periods for the region, respectively. The inventors validated the models using external testing of 106 wild, known-age white-tailed deer from Mississippi, Louisiana, Texas, and Oklahoma. A series of models that assigned animals to increasingly more specific age categories proved more effective than a single model. Two-dimensional digital photographic images of animals were obtained and are preferable for analyses and comparisons, particularly digital data. FIG. 1 shows a schematic representation of the proper view and specific morphometric measurements used to calculate ratios for age class separation of live, male, white-tailed deer from Mississippi, Louisiana, Texas, and Oklahoma, USA, from 2009 to 2010. The top representation (A) shows: chest depth (a), stomach depth (b), length of leg below the chest (c), neck width (d), and metacarpal width (e). The lower representation (B) shows: leg measurement 1 (a), leg measurement 2 (b), body length (c), and basal circumference (d).

The chest, stomach, legs, neck, and antlers generated nine (9) measurements (FIG. 1). Chest depth (planar view of chest girth) was measured immediately behind the shoulder and stomach depth (planar view of stomach girth) was measured at the midpoint between the end of the rump and apex of the scapula. The inventors measured leg measurement 1 from the proximal tip of the metacarpal to the apex of the scapula and leg measurement 2 from the apex of the scapula to the proximal edge of the dew claw. The length of leg below the chest was calculated as the difference between the chest depth and leg measurement 1. Neck width was measured directly below the lower mandible with the deer looking straight ahead. Body length was measured from the junction of the neck and brisket to the base of the tail. The inventors measured basal circumference just above the burr of the antler and metacarpal width at the most narrow point of the metacarpal bone.

Morphometric ratios were calculated using combinations of morphometric features to capture the changes in body proportions associated with aging (Kroll 1996, Demarais et al. 1999, Richards and Brothers 2003). Sixty-four (64) potential ratios were evaluated for known-age, captive deer for ages 1, 2, 3, 4, and >5 years, respectively, using PROC MEANS (SAS Institute, Cary, N.C., USA). Ratios were eliminated that did not vary among age classes, which resulted in twelve (12) useable ratios.

A stepwise logistic regression procedure in PROC LOGISTIC (SAS Institute, Cary, N.C., USA) was used to generate probability of a correct age class placement as a linear function of one or more explanatory variables. The response variable was age class (1, 2, 3, 4, or≥5 years). The explanatory variables were the 12 morphometric ratios. Single models were developed using the parameter estimates and intercepts generated from the logistic regression procedure. Various single models were developed by grouping different age classes. For example, the most specific age class grouping was 1, 2, 3, 4, or≥5 years. The most general age grouping model placed deer into two age classes: 1 year or≥2 years. Morphometric ratios were considered significant at alpha<0.100.

The inventors evaluated the single models on a wild, known-age deer data set from Mississippi, Louisiana, and Texas. This data set included seventy-two (72) males raised in enclosures, ranging from about 996 to about 7,680 acres in size. The enclosures were managed for high quality forage production using prescribed fire and food plots and deer had access to supplemental feeding (16% crude protein) ad libitum year-round. The enclosures were located in the Western Gulf Coastal Plain physiographic region of Texas and Louisiana and the Southeastern Plain physiographic region of Mississippi.

To test accuracy, the inventors incorporated the model parameter estimates and individual deer morphometrics into a Microsoft Excel 2007 spreadsheet (Microsoft Inc., Redmond, Wash., USA) to calculate probability of age class assignment. Deer were assigned to the age class with greatest probability.

To more effectively separate age classes, a multiple-step procedure was developed using a series of single models. This complex model followed a dichotomous key approach in which each step contained a best-fit single model. For example, immature bucks were separated from mature bucks by separating 1 year-olds from≥2 year-olds. Using a separate single model on the remaining animals, the inventors separated 2 year-olds from≥3 year-olds, with no possibility that any of these deer could be labeled as 1 year-olds.

The set of complex models were validated externally (pre- and post-breeding period) with two data sets of wild, known-aged deer: the Mississippi, Louisiana, and Texas set and an Oklahoma set. The Oklahoma population included thirty-four (34) males from an enclosure in the Cross Timbers physiographic region of south-central Oklahoma. This enclosure was managed using prescribed fire and rotational grazing and supplemental feed and food plots were not available.

The inventors incorporated the model parameter estimates and individual deer morphometrics into a Microsoft Excel 2007 spreadsheet (Microsoft Inc., Redmond, Wash., USA) to calculate probabilities of age class assignments. Deer were assigned to the age class with the greatest probability and the overall and age-class accuracy of the complex models were calculated. The final age assignment included a level of confidence based on the cumulative probability for each of the steps in the complex model. Deer were grouped based on management application and acceptable accuracy.

The 144 deer used to create single models averaged 3.6 years of age, with a range from 1 (12-22 months) to 12 years. The sample sizes per age class were: 1 (n=31), 2 (n=29), 3 (n=28), 4 (n=29), and ≥5 (n=28). Only two (2) of the 28 animals in the ≥5 year age class were 7 years or older.

Twenty-six (26) single models were generated for the pre- and post-breeding period. Overall model accuracy for wild deer was inadequate, so to improve accuracy for assignment of specific age classes, the inventors constructed complex models of the invention using a series of unique single models (pre-rut and post-rut) to estimate the age of male white-tailed deer in Mississippi, Louisiana, Texas, and Oklahoma (2009-2010). In the pre-rut period, the complex models of the invention correctly assigned 77% of wild deer to 1, 2, 3, or ≥4 years. The complex models correctly assigned 80% of wild deer to 1, 2-3, or ≥4 years (Table 1). In the post-rut period, the complex models correctly assigned 67% of wild deer to age class (1, 2, 3, 4, or ≥5 years). The complex models correctly assigned 79% of wild deer to 1, 2, 3-4 or ≥5 years and correctly assigned 83% of wild deer to 1, 2-3, or ≥4 (Table 1). The invention calculates estimated ages of animals utilizing animal data as described. The invention provides a novel accurate estimated age calculation of an animal and allows comparison of data and images from multiple input sources. Further, the invention allows for the presentation of data, images, and age results for comparison purposes with each other and/or with other animals via visual and/or audible display(s). The current invention is applicable to other animals as well including, but not limited to, members of the deer family taxonomic classification Cervidae, bovid family taxonomic classification Bovidae, and pronghorn family taxonomic classification Antilocapridae.

Discussion

Generating accurate estimates of the age of an animal from a photograph is now feasible using the mathematical and statistical methodology of the present invention.

Wildlife professionals need reliable, cost-effective ways to collect useful data. The inventors' research and the present invention provide an efficient and feasible system to estimate animal age from photographs and to provide data collection on live animals that is valuable to wildlife professionals, managers, hunters, and enthusiasts. Estimating characteristics such as age that are commonly used in selective harvest restrictions and that may be difficult to estimate visually can assist in making better management decisions.

The present invention provides wildlife agencies and groups with a new tool to visually estimate animal age characteristics. The new system and method can likewise enhance a hunter's or enthusiast's skills at accurately estimating animal age. Such valuable information and education can ultimately result in increased support for age-based harvest criteria in areas or in states needing to manage animal age classes. The accuracies generated by the program and system and method of the present invention can be valuable for animal management and research. Harvest decisions may not necessarily be made exclusively using the program of the present invention, but the system and method of the invention can effectively assist in making better and more efficient management decisions.

TABLE 1

Age class (years) accuracy (%) of the complex model for wild, [1, 2] live white-tailed deer from Mississippi, Louisiana, Texas, and Oklahoma, USA, 2009-2010.

| Age Grouping | | Pre-breeding period Wild (n = 30) | Post-breeding period Wild [1] (n = 42) | Wild [2] (n = 34) |
|---|---|---|---|---|
| 1, 2, 3, 4, or ≥5 | | 53 | 67 | 59 |
| | 1 | 75 | 100 | 75 |
| | 2 | 86 | 67 | 75 |
| | 3 | 40 | 56 | 50 |
| | 4 | 0 | 25 | 0 |
| | ≥5 | 71 | 86 | 83 |
| 1, 2, 3, or ≥4 | | 77 | 72 | 62 |
| | 1 | 75 | 100 | 75 |
| | 2 | 86 | 67 | 75 |
| | 3 | 40 | 56 | 50 |
| | ≥4 | 86 | 73 | 50 |
| 1, 2, 3-4, or ≥5 | | 53 | 79 | 74 |
| | 1 | 75 | 100 | 75 |
| | 2 | 86 | 67 | 75 |
| | 3-4 | 17 | 71 | 67 |
| | ≥5 | 71 | 86 | 83 |
| 1, 2-3, or ≥4 | | 80 | 83 | 71 |
| | 1 | 75 | 100 | 75 |
| | 2-3 | 75 | 83 | 86 |
| | ≥4 | 86 | 73 | 50 |
| 1-2, 3-4, or ≥5 | | 57 | 79 | 85 |
| | 1-2 | 91 | 83 | 100 |
| | 3-4 | 17 | 71 | 67 |
| | ≥5 | 71 | 86 | 83 |

[1] Wild, known-age deer from Mississippi, Louisiana, and Texas
[2] Wild, known-age deer from Oklahoma The above detailed description is presented to enable any person skilled in the art to make and use the invention. Specific details have been revealed to provide a comprehensive understanding of the present invention and are used for explanation of the information provided. These specific details, however, are not required to practice the invention, as is apparent to one skilled in the art. Descriptions of specific applications, analyses, and calculations are meant to serve only as representative examples. Various modifications to the preferred embodiments may be readily apparent to one skilled in the art, and the general principles defined herein may be applicable to other embodiments and applications while still remaining within the scope of the invention. There is no intention for the present invention to be limited to the embodiments shown and the invention is to be accorded the widest possible scope consistent with the principles and features disclosed herein.

While various embodiments of the present invention have been described above, it should be understood that they have been presented by way of example and not limitation. It will be apparent to persons skilled in the relevant art(s) that various changes in form and detail can be made therein without departing from the spirit and scope of the present invention. After reading the above description, it will be apparent to one skilled in the relevant art(s) how to implement the invention in alternative embodiments. The present invention should not be limited by any of the above-described exemplary embodiments.

The system and method of the invention, like related systems and methods used in the imaging and computer arts, are complex in nature and are often best practiced by empirically determining the appropriate values of the operating parameters or by conducting computer simulations to arrive at best design for a given application. Accordingly, all suitable modifications, combinations, and equivalents should be considered as falling within the spirit and scope of the invention. It should also be understood that the figures are presented for example purposes only. The present invention is sufficiently flexible and configurable so that it may be utilized in ways other than that shown in the accompanying figures.

REFERENCES

Demarais, S., D. Stewart, and R. N. Griffin. 1999. A hunter's guide to aging and judging live white-tailed deer in the southeast. Mississippi State University Extension Service, Forest and Wildlife Research Center, Mississippi State, USA.

Gee, K. L., J. H. Holman, M. K. Causey, A. N. Rossi, and J. B. Armstrong. 2002. Aging white-tailed deer by tooth replacement and wear: a critical evaluation of a time-honored technique. Wildlife Society Bulletin 30:387-393.

Gee, K. L., S. L. Webb, and J. H. Holman. Accuracy and implications of visually estimating age of male white-tailed deer using physical characteristics from photographs. Wildlife Society Bulletin 38:96-102.

Governo, R. M., S. M. Shea, G. Somers, and S. S. Ditchkoff. 2006. Using mandibular tooth row length to age yearling white-tailed deer. Wildlife Society Bulletin 34:345-350

Kroll, J. C. 1996. Aging and judging trophy whitetails. Center for Applied Studies in Forestry, College of Forestry, Stephen F. Austin State University, Nacogdoches, Tex., USA.

Richards, D., and A. Brothers. 2003. Observing and evaluating whitetails. Dave Richards Wilds of Texas, LLC, Boerne, Tex., USA.

Severinghaus, C. W. 1949. Tooth development and wear as criteria of age in white-tailed deer. Journal of Wildlife Management 13:195-216.

What is claimed is:

1. A method using a computer-based device for estimating the age of a live animal, the method comprising:
   obtaining at least one two-dimensional digital photographic image of the animal;
   measuring at least one anatomical feature of the animal wherein the at least one anatomical feature is relevant to estimating the age of the animal;
   obtaining at least nine quantitative measurements of animal body morphometric features;
   calculating morphometric ratios using the morphometric features to capture changes in animal body proportions associated with animal aging;
   evaluating the morphometric ratios and eliminating ratios that fail to vary among age classes;
   grouping the animal into an age-specific age class;
   calculating the estimated age of the animal; and
   presenting a visual or audible display, or a combination thereof, of data and estimated age results for the animal for comparison to data and age for other similar animals.

2. The method of claim 1, wherein the at least one anatomical feature is selected from the group of features consisting of chest depth, stomach depth, leg first length, leg second length, leg length below the chest, neck width, body length, basal circumference, and metacarpal width.

3. The method of claim 1, further comprising:
   developing at least one single model for estimating animal age by grouping different animal age classes;
   evaluating and comparing the at least one single model with at least one wild, known-age animal data set;
   developing at least one first complex model for estimating age using the at least one single model to separate age classes;
   validating the at least one first complex model with at least two wild, known-age animal data sets;
   calculating the probabilities of age class assignments;
   assigning the animal to the age class with the greatest probability; and
   calculating the overall and age class accuracy of the at least one first complex model.

4. The method of claim 3, further comprising:
   developing at least one second complex model for estimating animal age using at least one pre-rut period single model and at least one post-rut period single model for improving the accuracy of assignment of specific age classes.

5. The method of claim 2, wherein the chest depth anatomical feature is measured immediately behind the shoulder using the planar view of the chest girth, the stomach depth anatomical feature is measured at the midpoint between the end of the rump and apex of the scapula using the planer view of stomach girth, the leg first length anatomical feature is measured from the proximal tip of the metacarpal to the apex of the scapula, the leg second length anatomical feature is measured from the apex of the scapula to the proximal edge of the dew claw, leg length below the chest anatomical feature is measured as the difference between the chest depth anatomical feature and the leg first length anatomical feature, the neck width anatomical feature is measured directly below the lower mandible with the animal looking directly straight ahead, the body length anatomical feature is measured from the junction of the neck and brisket to the base of the tail, the basal circumference anatomical feature is measured just above the burr of the antler, and the metacarpal width anatomical feature is measured at the most narrow point of the metacarpal bone.

6. The method of claim 1, wherein the calculating the estimated age of the animal further comprises comparing data and digital images from multiple source inputs and presenting a display of the compared data and digital images for further analyzing by a user.

7. The method of claim 4, wherein the obtaining at least one digital image, measuring at least one anatomical feature, obtaining at least nine quantitative measurements of morphometric features, calculating morphometric ratios, evaluating and eliminating morphometric ratios, grouping into age classes, calculating estimated age, presenting a visual and/or audible display, developing at least one single model, evaluating and comparing the at least one single model, developing at least one first complex model, validating the at least one first complex model, calculating the probabilities of age class assignments, assigning to the age class with the greatest probability, calculating the overall and age class accuracy, and developing at least one second complex model are accomplished by and each portion of the method is executed using a computer processor-based device.

8. A non-transitory computer-readable medium comprised of computer processor-based instructions that utilize the method of claim 4 to instruct a computer-based device for estimating, calculating, and presenting the age of an animal.

9. The method of claim 1, wherein the animal is a member of the animal family selected from the group consisting of the deer family taxonomic classification Cervidae, bovid Family taxonomic classification Bovidae, and pronghorn family taxonomic classification Antilocapridae.

10. The method of claim 1, wherein the at least one two-dimensional digital photographic image of the animal is an image of the side view of the entire animal.

11. A system using a computer-based device for estimating the age of a live animal, the system comprising:
    means for obtaining at least one two-dimensional digital photographic image of the animal;
    means for measuring at least one anatomical feature of the animal wherein the at least one anatomical feature is relevant to estimating the age of the animal;
    means for obtaining at least nine quantitative measurements of animal body morphometric features;
    means for calculating morphometric ratios using the morphometric features to capture changes in animal body proportions associated with animal aging;
    means for evaluating the morphometric ratios and eliminating ratios that fail to vary among age classes;
    means tbr grouping the animal into an age-specific age class;
    means for calculating the estimated age of the animal:, and
    means for presenting a visual or audible display, or a combination thereof, of data and estimated age results for the animal for comparison to data and age fbr other similar animals.

12. The system of claim 11, wherein the at least one anatomical feature is selected from the group of features consisting of chest depth, stomach depth, leg first length, leg second length, leg length below the chest, neck width, hotly length, basal circumference, and metacarpal width.

13. The system of claim 11, further comprising:
    means for developing at least one single model for estimating animal age by grouping different animal age classes;
    means for evaluating and comparing the at least one single model with at least one wild, known-age animal data set;
    means for developing at least one first complex model for estimating age using the at least one single model to separate age classes;
    means for validating the at least one first complex model with at least two wild, known-age animal data sets;
    means for calculating the, probabilities of age class assignments;
    means for assigning the animal to the age class with the greatest probability; and
    means for calculating the overall and age class accuracy of the at least one first complex model.

14. The system of claim 13, further comprising:
    means for developing at least one second complex model for estimating animal age using at least one pre-rut period single model and at least one post-rut period single model for improving the accuracy of assignment of specific age classes.

15. The system of claim 12, wherein the chest depth anatomical feature is measured immediately behind the shoulder using the planar view of the chest girth, the stomach depth anatomical feature is measured at the midpoint between the end of the rump and apex of the scapula using the planer view of stomach girth, the leg first length anatomical feature is measured from the proximal tip of the metacarpal to the apex of the scapula, the leg second length anatomical feature is measured from the apex of the scapula to the proximal edge of the dew claw, leg length below the chest anatomical feature is measured as the difference between the chest depth anatomical feature and the leg first length anatomical feature, the neck width anatomical feature is measured directly below the lower mandible with the animal looking directly straight ahead, the body length anatomical feature is measured from the junction of the neck and brisket to the base of the tail, the basal circumference anatomical feature is measured just above the burr of the antler, and the metacarpal width anatomical feature is measured at the most narrow point of the metacarpal bone.

16. The system of claim 11, wherein the calculating the estimated age of the animal means further comprises a means for comparing data and digital images from multiple source inputs and a means for presenting a display of the compared data and digital images for further analyzing by a user.

17. The system of claim 14, wherein the means for obtaining at least one digital image, means for measuring at least one anatomical feature, means for obtaining at least nine quantitative measurements of morphometric features, means for calculating morphometric ratios, means for evaluating and eliminating morphometric ratios, means for grouping into age classes, means for calculating estimated age, means for presenting a visual and/or audible display, means for developing at least one single model, means for evaluating and comparing the at least one single model, means for developing at least one first complex model, means for validating the at least one first complex model, means for calculating the probabilities of age class assignments, means for assigning to the age class with the greatest probability, means for calculating the overall and age class accuracy, and. means for developing at least one second complex model are accomplished by and each process of the system is executed using a computer processor-based device.

18. A non-transitory computer-readable medium comprised of computer processor-based instructions that utilize the system of claim 14 to instruct a computer-based device for estimating, calculating, and presenting the age of an animal.

19. The system of claim 11, wherein the animal is a member of the animal family selected from the group consisting of the deer family taxonomic classification Cervidae, bovid family taxonomic classification Bovidae, and pronghorn family taxonomic classification Antilocapridae.

20. The system of claim 11, wherein the at least one two-dimensional digital photographic image of the animal is an image of the side view of the entire animal.

* * * * *